United States Patent [19]

Rentschler et al.

[11] 4,057,812
[45] Nov. 8, 1977

[54] CAMERA SHUTTER HAVING AN ELECTRONIC TIMING DEVICE

[75] Inventors: Waldemar T. Rentschler; Franz W. R. Starp; Karl Helber, all of Calmbach, Black Forest, Germany

[73] Assignee: Prontor-Werk Alfred Gauthier GmbH, Wildbad, Black Forest, Germany

[21] Appl. No.: 676,763

[22] Filed: Apr. 14, 1976

Related U.S. Application Data

[63] Continuation of Ser. No. 716,487, March 27, 1968, abandoned, and Ser. No. 111,629, Feb. 8, 1971, abandoned, and Ser. No. 299,179, Oct. 19, 1972, abandoned, and Ser. No. 492,099, July 26, 1974, abandoned.

[30] Foreign Application Priority Data

Apr. 1, 1967 Germany .................................. 41782

[51] Int. Cl.² .......................... G03B 7/08; G03B 9/08; G03B 9/58
[52] U.S. Cl. ....................................... 354/51; 354/29; 354/252; 354/258; 354/259
[58] Field of Search ...................... 354/29, 50, 51, 234, 354/238, 252, 258, 259

[56] References Cited

U.S. PATENT DOCUMENTS

| 3,314,346 | 4/1967 | Kremp et al. | 354/51 |
| 3,386,363 | 6/1968 | Rentschler | 354/258 |
| 3,520,239 | 7/1970 | Rentschler | 354/258 |
| 3,568,586 | 3/1971 | Rentschler | 354/238 |

FOREIGN PATENT DOCUMENTS

| 1,158,691 | 7/1969 | United Kingdom | 354/258 |

*Primary Examiner*—Russell E. Adams
*Attorney, Agent, or Firm*—Arthur A. March

[57] ABSTRACT

A camera shutter that has an electronic timing device and a photo-electric resistor and associated capacitor timing circuit; a charge starting contact is actuatable to commence the timing circuit action, and an electro-magnetically actuated locking device energized by the timing circuit to hold the shutter blade system open for the duration of the exposure time as determined by the photo-electric resistor. In addition, a mechanical device is provided which acts to delay the opening movement of the driving mechanism of the shutter blade system after actuation of the contact by an amount to compensate for the time taken by the electro-magnetic locking device to move to an unlocking position after the magnet thereof is de-energized by the timing circuit.

8 Claims, 7 Drawing Figures

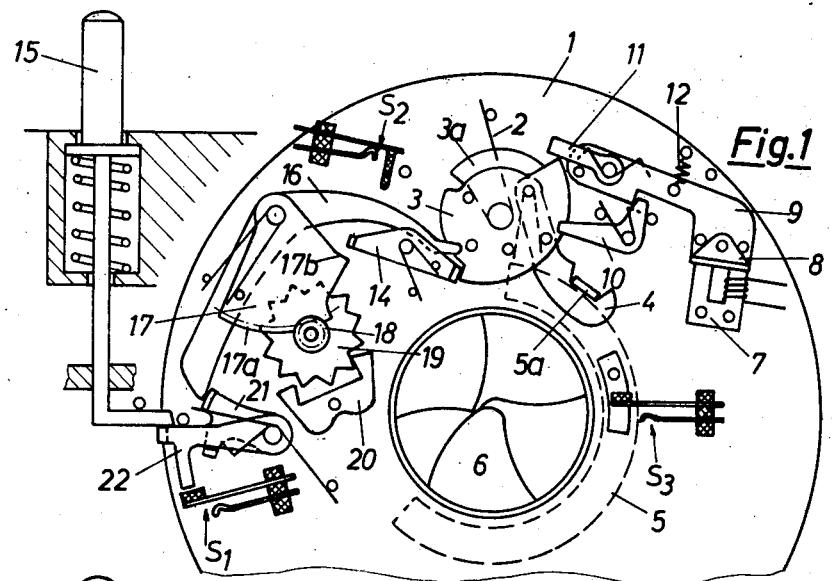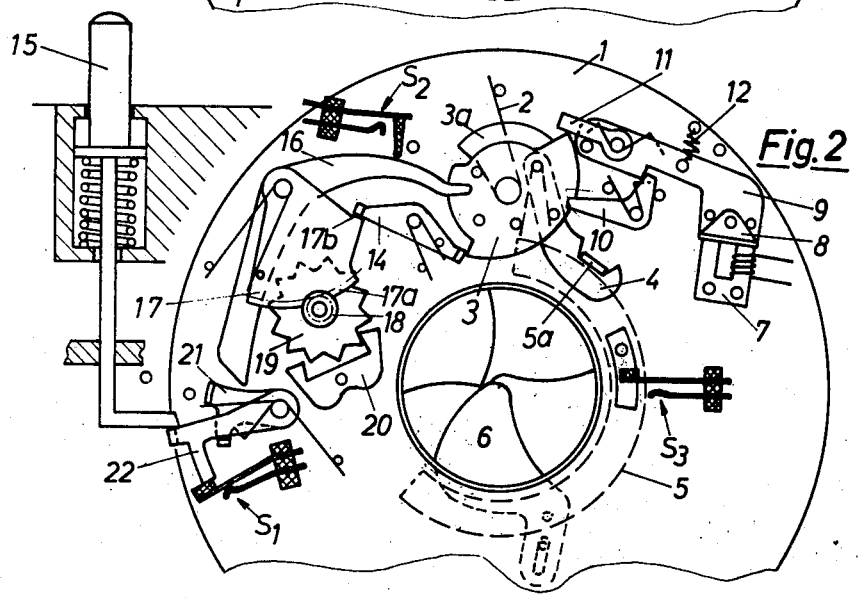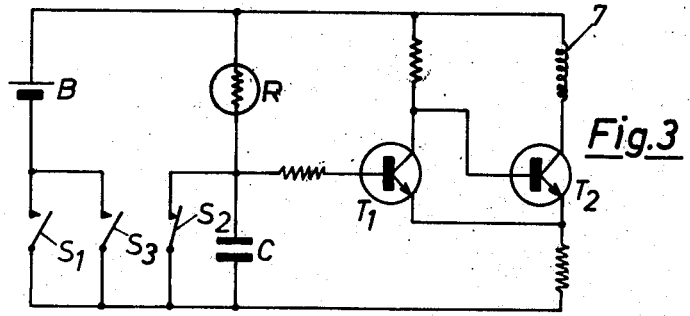

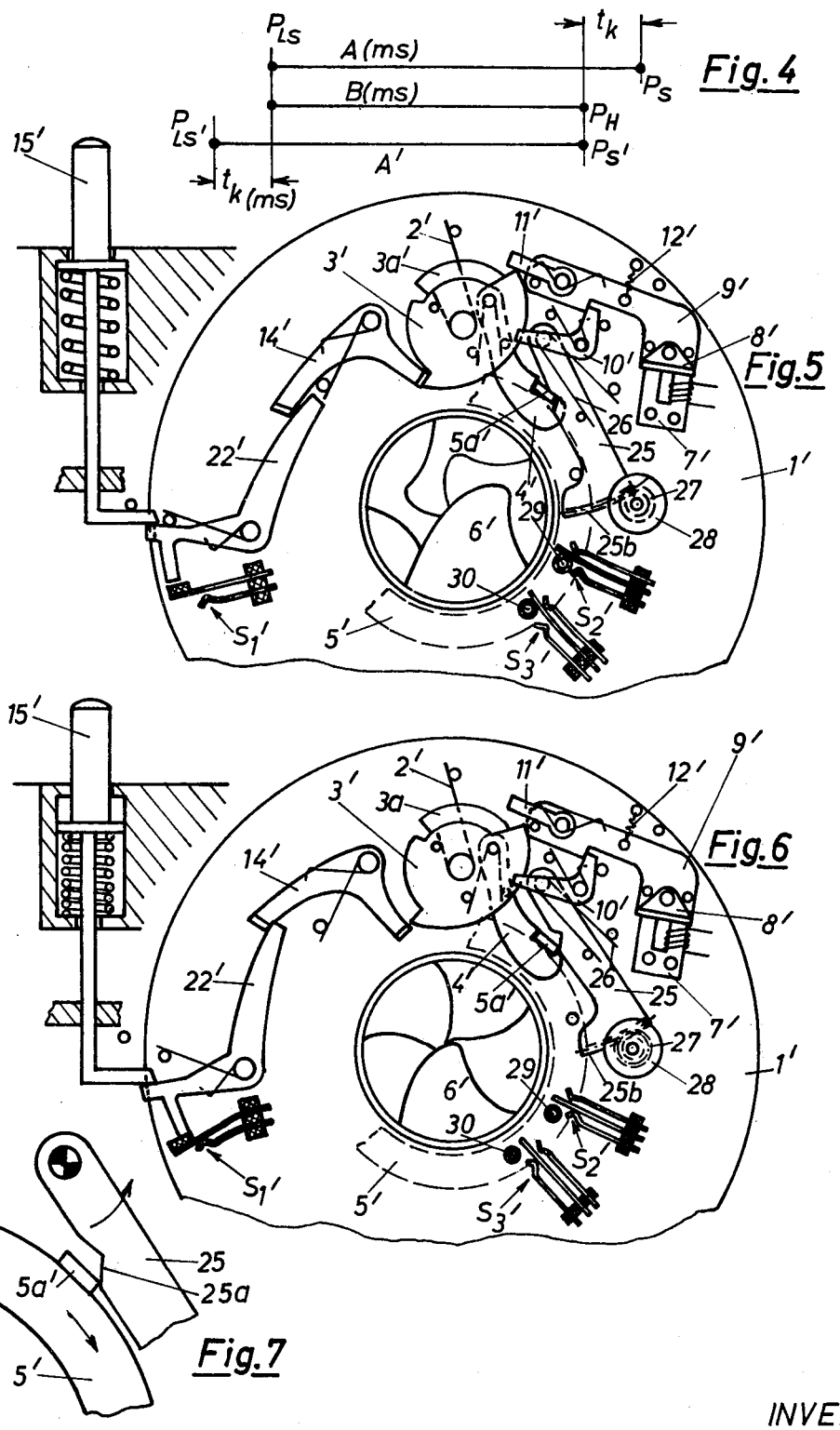

CAMERA SHUTTER HAVING AN ELECTRONIC TIMING DEVICE

This is a continuation in turn of copending U.S. applications: Ser. No. 716,487, filed Mar. 27, 1968; Ser. No. 111,629, filed Feb. 8, 1971; Ser. No. 299,179, filed Oct. 19, 1972; and Ser. No. 492,099, filed July 26, 1974; respectively now abandoned The invention relates to a camera shutter having an electronic timing device comprising a photo-resistor, a capacitor, a charge start contact associated therewith and a locking device adapted to be influenced thereby and actuating the shutter blade system, the blades being locked magnetically in the open position for the duration of exposure.

In electronic shutters of the kind described it is known that the time interval determined thereby begins with the activation of the charge start contact and ends with the cutting of the holding current in the magnet of the locking device. The actual exposure time produced by the shutter is however longer than this, a fixed delay being introduced by the traverse time of the movement paths of the magnet armature and the stop for the shutter drive controlled thereby. This added time, which may be several milliseconds, may cause difficulties in exposure timing as determined by lighting, since no adequate linear characteristic of the photo-resistance/exposure time function is obtained. Conditions are different in shutters with manual preselection of time, in which these problems do not occur, since the individual regulating resistors serving to determine the calibrated exposure time values may be made of such values that the additional mechanical time constant is taken into account in the electrically determined switching time of the trigger circuit, so that the indicated shutter timings are accurately achieved. The additional mechanical time delay has no noticeable adverse effect on long exposure times, since in relation to such times it is of negligible value. The mechanical delay does however seriously falsify short exposures of, say, 1/250th sec. as set by lighting conditions, since its value is commensurable with such timings and is added thereto.

It is an object of the invention to minimize such false timings inherent in electronic shutter systems and the invention provides a mechanical device which delays the opening movement of the driving mechanism of the shutter blade system thus compensating for the additional time constant caused by the movement of the magnetic locking device after cancelling the attraction of the magnet. In this manner, an electronic shutter is provided which ensures exposure times which are dependent only upon the light conditions even for the shortest exposure times.

If the mechanical device is a relay which first actuates the charge start contact of the electronic timing device, and after a period of time corresponding to the additional time constant unlocks the stop lever retaining the driving mechanism of the shutter blade system in the cocked position, then apart form the compensation of the mechanical time constant in an electronic shutter this arrangement also provides a smooth release and reduces camera shake, since the shutter is not released until after a time interval following depression of the shutter release corresponding to the said time constant.

In a preferred form of the invention the relay has a switch lever serving to actuate the charge starting contact and releasable in synchronism with the actuation of the camera release, together with an adjusting segment subject to the action of an escapement and acting on the stop lever of the driving mechanism.

A simple mechanical device for delaying the opening movement, having a minimum number of parts, is obtainable by providing a rotatably mounted brake lever, which in the beginning of the opening movement of the shutter blade system acts on the blade driving member, retarding it for a time interval equivalent to the mechanical time constant. To obtain a simple and reliable action it is further provided in accordance with the invention for the brake lever to be rotatably mounted at one end and to be provided with a sliding edge extending diagonally relative to its longitudinal extension and engaging the driving member of the shutter blade system, the lever being provided at its free end with teeth which mesh with a rotatably mounted escapement device.

The invention will be described in detail below, and two embodiments are shown in the accompanying drawings, in which:

FIG. 1 is a partial view of an electronic shutter with a mechanical relay in the cocked position, FIG. 2 is the same shutter after the camera release has been actuated or after release of the relay, the driving mechanism for the shutter blade system still being locked, FIG. 3 is a circuit diagram of an electronic delay circuit for the electromagnetic locking device for the driving mechanism of the shutter blade system, FIG. 4 is a graph showing the difference between the resulting two time intervals "A" and "B", caused by the mechanical movement operations of the locking device relative to the actuation of the charge starting contact, and the advancement of the actuation of the contact for compensating the additional mechanical time constant, FIG. 5 is an alternative embodiment with a mechaical delaying device in co-operation with the blade driving member, when the electronic shutter is cocked, FIG. 6 is the same arrangement after actuation of the camera release, i.e. after release of the blade driving member, and FIG. 7 shows on an enlarged scale the co-operation of the blade driving member with the sliding edge formed on the brake lever.

The numeral 1 in the drawing denotes a base plate conventionally inserted in the housing of a shutter. On this base plate there is a sliding crank drive biased by a spring 2, comprising a driving disc 3 and a propelling pawl 4 connected thereto. The propelling pawl 4 is in turn in driving engagement with a rotatably mounted shutter blade driving ring 5 co-axial with the lens aperture of the shutter housing, such that the driving ring executes a reciprocating movement from the cocked position shown in FIG. 1 during the action of the driving disc 3. The driving ring 5 in turn acts in known manner on a shutter blade system embracing several sectors 6, which opens and closes the lens aperture.

Co-operating with the driving disc 3 is an electromagnetic locking device comprising a magnet 7, an armature 8 co-operating therewith, a lever 9 supporting it and a trapping lever 10 which is in operational engagement with the driving disc 3. A transfer pawl 11 is pivoted on the armature lever 9, with a spring bias, by means of which, as shown in the drawing, the armature lever 9, when transferring the driving disc 3 into the cocked position, moves so that the armature 8 is brought into contact with the magnet 7 against the action of a spring 12.

A circuit as shown in FIG. 3 controls the magnetic locking device described above, the circuit providing a variable time delay. This delay, used in co-operation with the locking device of the circuit serving the timing, is formed as a trigger circuit. In the circuit there is a battery B, two transistors $T_1$ and $T_2$, the holding magnet 7, and two time determining members which are the photo-resistor R and capacitor C,. Apart from the RC combination there are a main switch $S_1$, a charge starting contact $S_2$ initiating the charge of the capacitor C and a parallel switch $S_3$. The latter is provided to maintain the current flow in the magnet 7 independently of the actuation of the main switch if due to inadequate lighting conditions, ultralong exposure times are required.

The electronic timing device described above, and its interaction with the mechanical components of the shutter, are known per se and do not form the subject matter of the invention. For the sake of completeness, a reference is made thereto that when the driving disc 3 of the shutter blade system is released, the latter under the action of the driving spring 2 rotates and opens the shutter blades until the stop flap 3a provided theron strikes against the trapping lever 10 of the locking device, stopping the disc. As a result the sliding crank drive is locked in the reversal position until the electronic delay circuit is operated. When this occurs the magnet 7 is deenergized and the armature lever 9 released. This releases the trapping lever 10, so that the driving disc 3 is able to continue its interrupted rotary movement and to close the shutter blade system again.

In a trigger or trip circuit of the kind described above and shown in FIG. 3, which is controllable in dependence upon the subject lighting by RC combination, with constant capacity and negligible leakage current through the capacitor C the ratio between the value of the photo-resistor R, variable in dependence upon the lighting conditions, and the operating time $t$ of the trigger, is always constant. This peculiarity is of special significance if the exposure time of a lens shutter is to be determined in dependence upon the light conditions by the trigger circuit by means of the photo-resistor R. One condition required from the photo-resistor is that it has a linear characteristic, i.e. when doubling the light intensity acting on the photo-resistor, its internal resistance is reduced by one half. This also shortens the operating time $t$ of the trigger to one half. Assuming that in the circuit of an electronic shutter these conditions have been fulfilled and the threshold or trip value correctly set, then the time from the actuation of the charge starting contact $S_2$ to the end of the current flow in the magnet 7 is the exposure time corresponding to the lighting conditions. This is identical with the nominal effective time to be obtained from the shutter. The actual effective time obtained is, however, greater by a mechanical time constant $t_k$ than the theoretic exposure time which is determined by the lighting conditions. The time interval "A" which, as shown in FIG. 4, begins with the actuation of the charge starting contact $S_2$ ($P_{LS}$) and ends with the actual closing of the shutter ($P_S$), is therefore always greater than the time interval "B", which also begins with the actuation of the charge starting contact $S_2$($P_{LS}$) and ends with the cutting of the holding current ($P_H$) of the magnet 7. The difference between these two time intervals is the additional mechanical time constant $t_k$. It is caused by the movements of the magnet armature 8 and the trapping lever 10 controlled thereby and acting on the driving member 3 of the shutter blade system.

To compensate the time constant $t_k$ in an electronic shutter of the kind described, a mechanical device shown in FIGS. 1 and 2 and formed as a mechanical relay means is used; this device co-operates with the charge starting contact $S_2$ and the stop lever 14 retaining the driving disc 3 of the shutter blade system in the cocked position, and is tripped by the camera release 15. As shown in the drawings, the mechanical relay means is formed of a rotatably mounted switch lever 16 and an adjusting segment 17 co-axially mounted therewith. A pinion 18 which is fixed to a ratchet wheel 19 meshes with the adjusting segment 17 having teeth 17a, which ratched wheel in turn co-operates with an oscillating armature 20. For locking the relay in its first position a catch lever 21 is provided with which a co-axially mounted actuating lever 22 is associated. The camera release 15 acts on this lever. The actuating lever 22 has a main switch $S_1$ associated therewith so that the switch is closed when the release 15 is depressed, and hence the magnet 7 is connected to battery potential via transistor T2. When this occurs, the catch lever 21 releases the lever 16 of the relay, which causes the lever and the segment 17 to execute a simultaneous rotation about their bearing pin in an anticlockwise direction, until finally the lever 16 breaks the charge starting contact $S_2$ and after a time interval corresponding to the time constant $t_k$ the segment strikes with its edge 17b against the stop lever 14, and initiates the shutter action. Dependent upon lighting conditions the driving disc 3 is locked by the magnetic locking device in a position which is the open position of the shutter blade system, with the flap 3a of the driving disc 3 resting against the trapping lever 10. The shutter blade system is held open until the capacitor C has been charged to a predetermined value i.e. until the electronic delay circuit has been tripped; thereupon armature 8 is released by de-energisation of the magnet 7 whereby the trapping lever 10 again releases the driving disc 3. Since the switch lever 16 of the relay, before releasing the shutter drive, has actuated the charge starting contact $S_2$ at an earlier period ($P_{LS}'$) (FIG. 4), which corresponds to the additional time constant tk, the beginning of the closing movement of the shutter blade system ($P_S'$) not only theoretically but also actually coincides in time with the control impulse given by the electronic delay device for de-energising the magnet 7, whereby the exposure time interval "A" is terminated, as indicated in FIG. 4. To compensate for any manufacturing variations the position of the charge starting switch $S_2$ may be made adjustable relative to the switch lever 16. This permits the time from the contact separation of the charge starting contact $S_2$ to the beginning of the sector opening to be adjusted with great accuracy.

FIGS. 5 to 7 show a further embodiment of an electronic shutter which is similar both in structure and function to that shown in FIGS. 1 and 2. Components having the same action therefore have identical reference numerals, but are additionally furnished with an apostrophy. As shown, a device for delaying the opening movement of the shutter blades is used comprising a simple rotatably mounted brake lever 25. This lever, which acts on a projection 5a' provided on the driving member 5', is so arranged that it has a retarding effect on the shutter blade system only in the overlap phase of the shutter blades 6', i.e. only in the starting phase of the opening movement of the driving member 5'. To obtain a suitable action the brake lever 25, as clearly shown in FIG. 7, is provided with a slant sliding edge 25a against which the projection 5a' on the driving ring strikes. The projection 5a' may also act to connect the driving ring 5' operationally with the propelling pawl 4'. When the driving ring 5' starts to rotate the brake lever 25 is displaced by the edge 25a against the action of spring 26 from its original position shown in FIG. 5. The time required by the driving ring for the complete displacement of the brake lever 25 corresponds accurately to the additional mechanical time constant $t_k$. To intensify the retarding movement, the brake lever 25 may be provided additionally at one end with teeth 25b which mesh with a pinion 27, which is fixed to a rotatably mounted retarding disc 28.

In the embodiment shown in FIGS. 5 and 6 the main switch $S_1'$ also has associated therewith an actuating lever 22' displaceable by the camera release 15', which lever 22' in turn co-operates with a stop lever 14' holding the shutter in the cocked position. The charge starting contact $S_2'$ is thus so associated with the driving member 5' of the shutter blade system that in the cocked position of the shutter it is closed, and with the beginning of the opening movement of the driving member 5' it is opened, thus starting the charging of the capacitor C of the delay circuit. For this purpose the driving member 5' carries an insulated pin 29, against which the contact tongue of the charge starting contact $S_2$ rests and which this tongue follows at the beginning of the movement of the driving member. The action of the charge starting contact $S_2'$ may be identical with the action of switch $S_3'$. This switch co-operates with a pin 30 mounted on the driving member 5'. The switch $S_3'$ may be change-over device to switch the photo-electric resistor R from an exposure meter (not shown in the drawing) into the circuit of the electronic timing device.

We claim:

1. Timing arrangement for controlling the operation of a camera shutter blade system comprising
   actuatable shutter blade drive means including movable means arranged upon actuation of the drive means to carry out an opening movement and thereafter a closing movement for operating the shutter blade system,
   a timing circuit containing a photo-electric resistor and associated capacitor for controlling the duration of the shutter exposure time as determined by the photo-electric resistor,
   a charge starting contact actuatable to commence the timing operation of said timing circuit and operatively arranged for immediate actuation by said movable means upon initial actuation of the driving means and before the opening movement is carried out,
   an electromagnetically actuated locking device energizable by the timing circuit upon actuation of the charge starting contact and including mechanical locking means arranged with respect to the drive means for mechanical movement from a normally locking position prior to actuation of the drive means to an unlocking position upon de-energization of the locking device and in the locking position said locking means being operatively connected to the drive means to hold the shutter blade system open for the duration of the exposure time as determined by said photo-electric resistor after the opening movement and before the closing movement of the movable means, the mechanical movement of the mechanical locking means from the locking position to the unlocking position taking a determinable amount of time, and
   a mechanical brake device arranged for direct braking contact with the movable means after initial actuation of the drive means and immediate actuation of the charge starting contact and in turn commencement of the timing operation of the timing circuit to delay the opening movement of the movable means by an initial offsetting amount of time which selectively pre-compensates for the corresponding determinable amount of time taken by the mechanical locking means of the electromechanically actuated locking device to move from the locking position to the unlocking position thereof upon de-energization by the timing circuit in order for the closing movement of the movable means to be carried out.

2. Timing arrangement according to claim 1 wherein said movable means is a rotatable drive ring having a brake surface on a part thereof and said brake device is operatively arranged for direct braking contact with said brake surface of the drive ring.

3. Timing arrangement according to claim 1 wherein said brake device includes a pivotally mounted brake lever and means to apply the brake lever to said brake surface of the drive ring to retard the opening movement of the movable means for a said offsetting amount of time selectively equal to said corresponding determinable amount of time.

4. Timing arrangement according to claim 3 wherein said brake lever is pivotally mounted at one end portion thereof, and provided with a longitudinal extension having a sliding edge diagonally extending with reference to such longitudinal extension and engaging said brake surface of the drive ring, and further provided with a toothed sector on an extension at the other end portion of said brake lever in operative engagement with an escapement device activated by said toothed sector.

5. Timing arrangement for controlling the operation of a camera shutter blade system comprising
   actuatable shutter blade drive means including unitary movable means arranged upon actuation of the drive means to carry out an opening movement and thereafter a closing movement for operating the shutter blade system,
   a timing circuit containing a photo-electric resistor and associated capacitor for controlling the duration of the shutter exposure time as determined by the photo-electric resistor,
   a charge starting contact actuatable to commence the timing operation of said timing circuit and operatively arranged for immediate and direct actuation by said movable means upon initial actuation of the driving means and before the opening movement is carried out,
   an electromagnetically actuated locking device energizable by the timing circuit upon actuation of the charge starting contact and including mechanical locking means arranged with respect to the drive means for mechanical movement from a normally locking position prior to actuation of the drive means to an unlocking position upon de-energization of the locking device and in the locking position said locking means being operatively connected to the drive means to hold the shutter blade system open for the duration of the exposure time as determined by said photo-electric resistor after the opening movement and before the closing movement of the movable means, the mechanical movement of the mechanical locking means from the locking position to the unlocking position taking a determinable amount of time, and a mechanical brake device arranged for direct braking contact with the movable means after initial actuation of the drive means and immediate actuation of the charge starting contact and in turn commencement of the timing operation of the timing circuit to delay the opening movement of the movable means by an initial offsetting amount of time which selectively precompensates for the corresponding determinable amount of time taken by the mechanical locking means of the electromechanically actuated locking device to move from the locking position to the unlocking position thereof upon de-energization by the timing circuit in order for the closing movement of the movable means to be carried out.

6. Timing arrangement according to claim 5 wherein said movable means is a rotatable drive ring having a brake surface on a part thereof and said brake device is operatively arranged for direct braking contact with said brake surface of the drive ring.

7. Timing arrangement according to claim 6 wherein said brake device includes a pivotally mounted brake lever and means to apply the brake lever to said brake surface of the drive ring to retard the opening movement of the movable means for a said offsetting amount of time selectively equal to said corresponding determinable amount of time.

8. Timing arrangement according to claim 7 wherein said brake lever is pivotally mounted at one end portion thereof, and provided with a longitudinal extension having a sliding edge diagonally extending with reference to such longitudinal extension and engaging said brake surface of the drive ring, and further provided with a toothed sector on an extension at the other end portion of said brake lever in operative engagement with an escapement device activated by said toothed sector.

* * * * *